United States Patent [19]

Hughes et al.

[11] Patent Number: 4,547,556
[45] Date of Patent: Oct. 15, 1985

[54] AIR-CURING ACRYLIC POLYMERS

[75] Inventors: Kathleen A. Hughes, Plymouth Meeting; Graham Swift, Blue Bell, both of Pa.

[73] Assignee: Rohm and Haas Company, Philadelphia, Pa.

[21] Appl. No.: 436,258

[22] Filed: Oct. 25, 1982

[51] Int. Cl.[4] .................... C09D 3/81; C09D 5/40; C09D 5/02; C08L 91/00
[52] U.S. Cl. ...................................................... 526/75
[58] Field of Search ........................................... 526/75

[56] References Cited

U.S. PATENT DOCUMENTS 4,312,797  1/1982  Aihara et al. ..................... 428/461

Primary Examiner—Ronald W. Griffin
Attorney, Agent, or Firm—Michael B. Fein

[57] ABSTRACT

A composition comprising a water reducible vinyl additional polymer having pendant unsaturated air drying fatty acid ester groups and additional pendant groups selected from secondary amine, tertiary amine, and combinations thereof are disclosed, as are methods for preparing such polymers, solvent coatings, water reducible coatings, and electrodeposition coatings containing such polymers.

13 Claims, No Drawings

AIR-CURING ACRYLIC POLYMERS

BACKGROUND OF THE INVENTION

This invention relates to coatingg compositions, especially general solvent coatings with air drying properties, water reducible coatings with air drying properties and electrodeposition coatings.

DESCRIPTION OF THE PRIOR ART

Antonelli et al, U.S. Pat. No. 4,242,243 discloses a high solid coating composition that dries rapidly to tack free finish and cures under ambient temperature conditions, and contains a film forming polymer having a backbone of polymerized monomers of alkyl methacrylate or styrene and alkyl acrylate, and hydroxyl-containing monomers, and has attached through the hydroxyl group drying oil fatty acid. In the Antonelli et al patent the drying oil fatty acids are attached by reaction of the carboxyl group of the drying oil fatty acid and pendant hydroxyl group of the hydroxyl backbone.

D'Alelio et al, U.S. Pat. No. 3,284,385, points out that if free radical initiation, thermal initiation, cationic initiation are used, the products are crosslinked-gel polymers. Soluble polymers are obtained only when using base-catalyzed initiation such as anionic polymerization.

SUMMARY OF THE INVENTION

It is the object of the present invention to provide a vinyl unsaturated monomer having a fatty acid chain which is copolymerizable with other vinyl unsaturated monomers. It is a further object of the present invention to find a composition which has utility in general solvent coatings with air drying properties, water-reducible coatings with air drying properties, and electodeposition coatings. It is a still further object of the invention to provide a method for preparing such compositions which can be carried out in a water miscible solvent in the presence of a free radical source.

These objects, and others as will become apparent from the following disclosure, are achieved by the present invention which comprises a water reducible vinyl addition polymer having pendant unsaturated air drying fatty acid ester groups and additional pendant groups selected from secondary amine, tertiary amine, and combinations thereof. In another aspect, the invention comprises a method wherein an ester of a hydroxyl functional vinyl unsaturated monomer and a drying oil fatty acid is first prepared and then copolymerized with additional vinyl unsaturated monomer in a water miscible solvent in the presence of a free radical source.

DETAILED DESCRIPTION OF THE INVENTION AND THE PREFERRED EMBODIMENTS

The water-reducible vinyl addition polymers are prepared by first preparing an ester of hydroxy functional vinyl unsaturated monomer and drying oil fatty acid and then copolymerizing the ester with additional vinyl unsaturated monomers in a water miscible solvent and in the presence of a free radical source.

Suitable hydroxy functional vinyl unsaturated monomers are hydroxyalkyl (meth)acrylates, especially those having two to four carbon atoms in the alkyl group such as hydroxyethyl methacrylate; hydroxypropyl methacrylate, hydroxybutyl methacrylate, hydroxyethyl acrylate, hydroxypropyl acrylate, hydroxybutyl acrylate, and mixtures thereof. Also, 2-hydroxyethyl-2-ethyl acrylate, 2-hydroxyethyl-2-butyl acrylate, 3-hydroxypropyl-2-propyl acrylate, 3-hydroxypropyl-2-butyl acrylate, 3-hydroxybutyl-2-ethyl acrylate, 3-hydroxybutyl-2-butyl acrylate, 4-hydroxybutyl-2-butyl acrylate, 2-hydroxyethyl-2-ethyl methacrylate, and mixtures thereof.

Suitable fatty acids are linseed oil, castor oil, dehydrated castor oil, soybean oil, tung oil, safflower oil, conjugated safflower oil, oticica oil, sunflower oil, sesame oil, corn oil, tobacco oil, and poppyseed oil. Also linoleic acid, linolenic acid, eleostearic acid, dehydrated ricinoleic acid and mixtures thereof.

Suitable additional vinyl unsaturated monomers which are the source for additional pendant groups selected from secondary amine, tertiary amine, and combinations thereof are selected from dimethylaminoethyl methacrylate, dimethylaminoethyl acrylate, diethylaminoethyl methacrylate, diethylaminoethyl acrylate, tertiary butylaminoethyl acrylate, tertiary butylaminoethyl methacrylate, 4-vinyl pyridine, crotonic acid and the like.

Other additional vinyl unsaturated monomers can be used, and can be selected from, for example, methyl methacrylate, butyl methacrylate, ethyl methacrylate, methyl acrylate, butyl acrylate, ethyl acrylate, ethylhexyl acrylate, ethylhexyl methacrylate, 2-hydroxyethyl methacrylate, 2-hydroxyethyl acrylate, hydroxypropyl acrylate, hydroxypropyl methacrylate, acrylonitrile, acrylamide, methacrylonitrile, methacrylamide, isobutyl acrylate, isobutyl methacrylate, isobutyoxylmethyl acrylamide, n-butoxymethyl acrylamide, styrene, alpha-methyl styrene, para-methyl styrene, and vinyl toluene.

The solvent used is a water miscible solvent, and can be, for example, selected from methyl Cellosolve, ethyl Cellosolve, butyl Cellosolve, methyl Carbitol, ethyl Carbitol, butyl Carbitol, Propasol P, Propasol B, Propasol DM, ethylene glycol, propylene glycol, isopropanol, tertiary butanol, methyl ethyl ketone and blends thereof.

Typically the polymers have a degree of polymerization, DP, of about 3–250, and are prepared with a conventional free radical source such as benzoyl peroxide, lauroyl peroxide, t-butyl peroxypivalate, t-butyl hydroperoxide, t-butyl peroctoate, t-butyl peracetate, t-butyl perbenzoate, 2,2-azobis(isobutyronitrile), 2,2'-azobis(2,4-dimethylvaleronitrile), diisopropyl peroxydicarbonate, 1-t-butylazo-1-cyanocyclohexane, 2-t-butylazo-2-cyanopropane, 2-t-butylazo-2-cyanobutane, and di-t-butyl peroxide.

The degree of polymerization can be controlled by initiator level and/or selection of type and amount of chain transfer agent which can be alkyl mercaptans, for example, n-dodecyl mercaptan, amyl mercaptan, t-dodecyl mercaptan; thioglycolic acid; 2-hydroxyethyl mercaptan; isopropanol; bromotrichloromethane; chloroform; carbon tetrachloride; and cumene.

These chain transfer agents are well known additives for controlling polymer molecular weight. In another aspect the molecular weight can be controlled so as to achieve a high solids solution polymer suitable for use in the absence of water, but it is preferred to neutralize and reduce by addition of water and acid or base or either a soluble polymer or a stable latex dispersion for typical uses.

When used in electrodeposition coatings, the polymers are formulated with pigment and dryers according to techniques known in the art to give paints suitable for application by either cathodic or anodic deposition, depending on whether the polymer has acid functionality or amine functionality. In cases where it is amine functionality, cathodic deposition is used to prepare a coating from a water based polymer having good resistance to UV degradation, very good exterior durability, good solvent, water, and corrosion resistance.

The polymers can also be used for metal decorating, inks, aqueous reducible coatings, and the like, which do not require electrodeposition and can be applied by any conventional methods.

Without intending to be limiting, the following detailed examples are presented to illustrate a few embodiments of the invention. All parts and percentages are on a weight basis unless otherwise indicated.

EXAMPLE 1 iBMA/BA/MAOE-LO/DMAEMA//50/10/30/10

A 305 part butyl Cellosolve charge is heated to 95° C. A monomer mix consisting of 250 parts of isobutyl methacrylate, 50 parts of n-butyl acrylate, 150 parts of methacryloxyethyl esters of linseed oil fatty acids and 50 parts of dimethylaminoethyl methacrylate and an initiator solution consisting of 16.7 parts of t-butyl peroxypivalate (75% in mineral spirits) are added linearly over three hours to the solvent charge. Reaction temperature is held at 95±2° C. throughout these gradual monomer and initiator additions. Residual monomers are chased with an additional 5 parts of t-butyl peroxypivalate solution.

The products had a non-volatile solids content of 60% and a viscosity of 12,000 centipoises at 25° C.

EXAMPLE 2 iBMA/BMA/BA/AA/MAOE-LO//40/27.5/10/12.5/10

One hundred twenty-five parts of butyl Cellosolve is heated to 150° C. and a monomer mix consisting of 200 parts of isobutyl methacrylate, 137.5 parts of n-butyl methacrylate, 50 parts of n-butyl acrylate, 62.5 parts of acrylic acid and 50 parts of methacryloxyethyl esters of linseed oil fatty acids and an initiator solution consisting of 1.5 parts of t-butyl perbenzoate dissolved in 10 parts of butyl Cellosolve are added to the 150° C. solvent over three hours at a constant rate. Reaction temperature is held at 150±2° C. throughout the gradual additions and for 15 minutes after the addition of an initiator chaser solution consisting of 3 parts of t-butyl perbenzoate dissolved in 10 parts of butyl Cellosolve. The polymer solution is then cooled to 100° C. and diluted with 174 parts of isopropanol.

The product has a non-volatile solids content of 62.3% and a viscosity at 25° C. of 15,600 centipoises.

EXAMPLES 3-5

Preparation and Evaluation of Paints

EXAMPLE 3

Preparation of Cathodic Electrodeposition Paints

Blend 197.2 parts of the cationic polymer solution (55.6 solids) prepared in Example 1 and 83.2 parts of TiO₂ (Titanox T 2020) and grind on three-roll mill in three passes. Transfer 140.2 parts of this grind into a paint can and add let-down materials excluding water in the order indicated below.

| Grind | 140.2 p |
|---|---|
| Let Down | |
| Cationic polymer (55.6%) | 276.1 p |
| Coalescent (2-Ethyl Hexanol) | 25.0 p |
| Cobalt Naphthenate (6%) | 3.5 p |
| Activ-8 | 2.1 p |
| Lactic Acid (88.2%) | 12.2 p |
| D.I. Water | 2040.9 p |
| | 2500.0 p |

During this addition maintain good agitation. Add the water at very slow rate. The viscosity will increase until the inversion point is reached. After that point, the rest of the water can be added rapidly.

The final paint is at 10% solids, has a pigment/binder ratio of 0.2/1/0, and contains 12% coalescent (e.g. 2-ethyl hexanol, or Texanol) on total solids. The degree of neutralization is ca. 90%.

EXAMPLE 4

Cathodic Electrodeposition of Paint Films

The panel to be coated is used as the cathode, a stainless steel panel is the anode, and the paint, which is kept under constant agitation, is the electrolyte/bath. The panels are coated at room temperature; deposition voltage is between 50 and 300 volts.

| Paint | Deposition Time | Deposition Voltage | Film Thickness |
|---|---|---|---|
| 2a | 2 min. | 150 volts | 1.5 mils |
| 2b | 2 min. | 250 volts | 1.2 mils |
| 2c | 2 min. | 150 volts | 1.2 mils |
| 2d | 2 min. | 130 volts | 1.3 mils |
| 2e | 2 min. | 150 volts | 1.3 mils |
| 2f | 2 min. | 130 volts | 1.5 mils |
| 2g | 2 min. | 130 volts | 0.8 mils |

The coated panels are rinsed, and then force dried for 30 minutes at 180°-220° F.

EXAMPLE 5

Evaluation of Coatings

The panels were evaluated after 7 days air dry (ambient conditions).

| Panel | 20°/60° | Hardness Pencil | (7 days) KHN | Gasoline Resistance | Salt Spray Resistance (500 hrs.) | QUV Retained Gloss Reflectance (20°) (500 hrs.) |
|---|---|---|---|---|---|---|
| 2a | 62/85 | 4B | 1.10 | poor-fair | good | 69% |
| 2b | 68/86 | 2B | 2.46 | fair | good | — |
| 2c | 67/86 | 4B | 1.30 | good-v.good | good | 62% |
| 2d | 85/87 | 5B | 0.68 | poor-fair | good | 37% |
| 2e | 77/89 | 2B | 3.16 | good-v.good | — | — |
| 2f | 60-84 | 4B | — | poor | — | 48% |

-continued

| Panel | 20°/60° | Hardness Pencil | (7 days) KHN | Gasoline Resistance | Salt Spray Resistance (500 hrs.) | QUV Retained Gloss Reflectance (20°) (500 hrs.) |
|---|---|---|---|---|---|---|
| 2g | 35/77 | B | 6.60 | good | fair | 55% |

Our results thus show that coatings prepared according to our invention have good appearance, good mechanical and resistance properties, and good resistance toward degradation by UV light.

We claim:

1. A composition comprising a water reducible vinyl addition polymer having pendant unsaturated air drying fatty acid ester groups and additional pendant groups selected from secondary amine, tertiary amine, and combinations thereof.

2. Composition in accordance with claim 1 wherein the fatty acid is selected from linseed oil, castor oil, dehydrated castor oil, soybean oil, tung oil, safflower oil, conjugated safflower oil, oticica oil, sunflower oil, sesame oil, corn oil, tobacco oil, and poppyseed oil.

3. Composition in accordance with claim 1 wherein the additional pendant group is selected from dimethylaminoethyl methacrylate, dimethylaminoethyl acrylate, diethylaminoethyl methacrylate, diethylaminoethyl acrylate, tertiary butylaminoethyl acrylate, tertiary butylaminoethyl methacrylate and 4-vinyl pyridine.

4. Composition in accordance with claim 1 wherein the vinyl addition polymer is polymerized from monomers selected from methyl methacrylate, butyl methacrylate, ethyl methacrylate, methyl acrylate, butyl acrylate, ethyl acrylate, ethylhexyl acrylate, ethylhexyl methacrylate, 2-hydroxyethyl methacrylate, 2-hydroxyethyl acrylate, hydroxypropyl acrylate, hydroxypropyl methacrylate, acrylonitrile, acrylamide, methacrylonitrile, methacrylamide, isobutyl acrylate, isobutyl methacrylate, isobutyoxylmethyl acrylamide, n-butoxymethyl acrylamide, styrene, alpha-methyl styrene, para-methyl styrene, and vinyl toluene.

5. Composition in accordance with claim 1 wherein the polymer is polymerized in a water miscible solvent.

6. Composition in accordance with claim 5 wherein the water miscible solvent is selected from methyl Cellosolve, ethyl Cellosolve, butyl Cellosolve, methyl Carbitol, ethyl Carbitol, butyl Carbitol, Propasol P, Propasol B, Propasol DM, ethylene glycol, propylene glycol, isopropanol, tertiary butanol, methyl ethyl ketone and blends thereof.

7. Composition in accordance with claim 1 wherein the degree of polymerization, DP, is about 3 to 250.

8. Method of preparing water reducible vinyl addition polymers having pendant unsaturated air drying fatty acid ester groups and additional pendant groups selected from secondary amine, tertiary amine, and combinations thereof comprising
(a) preparing an ester of a hydroxy-functional vinyl unsaturated monomer and drying oil fatty acid;
(b) copolymerizing said esters with additional vinyl unsaturated monomers in a water miscible solvent in the presence of a free radical source.

9. Method of claim 8 wherein the polymer is neutralized and reduced by addition of water and acid or base to either a soluble polymer or a stable latex dispersion.

10. Method of claim 8 wherein the molecular weight is controlled so as to achieve a high solids solution polymer suitable for use in absence of water.

11. Method of claim 8 wherein the free radical source is selected from benzoyl peroxide, lauroyl peroxide, t-butyl peroxypivalate, t-butyl hydroperoxide, t-butyl peroctoate, t-butyl peracetate, t-butyl perbenzoate, 2,2-azobis(isobutyronitrile), 2,2',-azobis(2,4-dimethylvaleronitrile), diisopropyl peroxydicarbonate, 1-t-butylazo-1-cyanocyclohexane, 2-t-butylazo-2-cyanopropane, 2-t-butylazo-2-cyanobutane, and di-t-butyl peroxide.

12. Method of claim 8 wherein chain transfer agent is selected from n-dodecyl mercaptan, t-dodecyl mercaptan, thioglycolic acid, amyl mercaptan, 2-hydroxyethyl mercaptan, isopropanol, and cumene, and is added to lower polymer molecular weight.

13. Solvent coatings, water reducible coatings, and electrodeposition coatings containing a polymer composition according to claim 1.

* * * * *